Dec. 13, 1938.   W. F. MARTIN   2,140,022

IMITATION FLOWER

Filed Jan. 18, 1938

INVENTOR.
WILLIAM F. MARTIN
BY *J. Ledermann*
ATTORNEY.

Patented Dec. 13, 1938

2,140,022

UNITED STATES PATENT OFFICE 2,140,022

IMITATION FLOWER

William F. Martin, Forest Hills, N. Y.

Application January 18, 1938, Serial No. 185,590

2 Claims. (Cl. 41—13)

One object of this invention is the provision of artificial flowers or plants, more particularly metal flowers and plants having metal stems adapted to be mounted in a garden or imitation garden, flower boxes, or in any other suitable place. Plants thus constructed and suitably painted are particularly adaptable to urban dwellers who lack the facilities for a natural garden, and the flowers are a constant source of beauty the year round.

The above and other objects will become apparent in the description below, in which characters of reference refer to like-numbered parts in the accompanying drawing, forming a part hereof.

Referring briefly to the drawing, Figure 1 is an elevational view of an artificial flower and stem.

Figure 1:
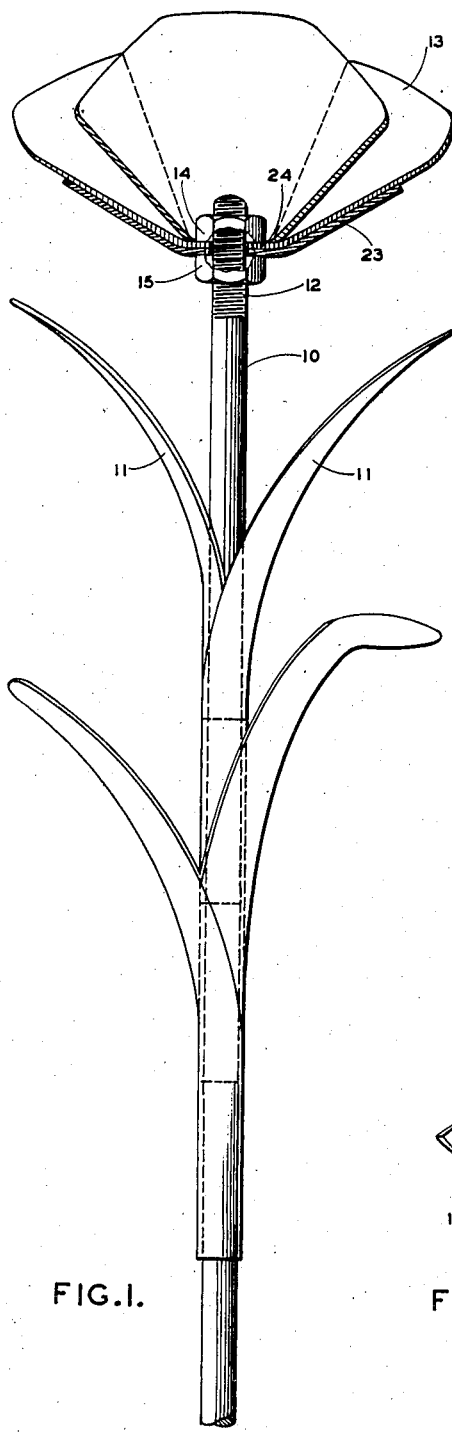
Figure 2:
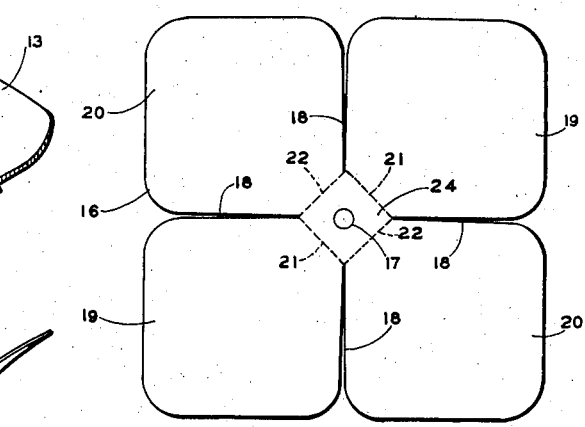
Figure 2 is a plan view of a pattern of which the flower is formed.
Figure 4:
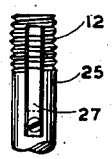
Figure 4 is a front view of the top of a modified form of flower stem.
Figure 5:
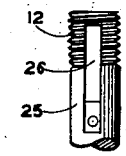
Figure 5 is a view similar to Figure 4, with the toothed spring lock removed.
Figure 6:
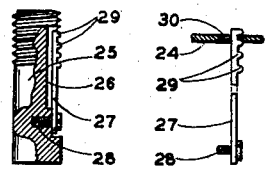
Figure 6 is a view taken at right angles to Figure 4, partly in section.
Figure 7:
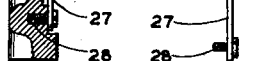
Figure 7 is a view illustrating the operation of the spring lock.

Referring in detail to the drawing, the numeral 10 represents a metal rod or stem having leaves 11 extending therefrom after the fashion of a natural flower stem. The upper end 12 of the stem 10 is threaded, and a metal flower 13 is secured to the top of the stem by means of nuts 14 and 15.

Figure 3:
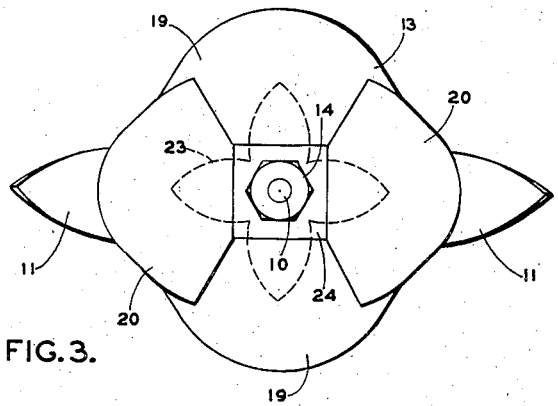
Figure 3 is a plan view of Figure 1.

The flower 13 is formed of a single square piece of sheet metal 16 provided with a hole 17 through the center and having four slits 18 cut, in substantially the form of a cross, as shown, from the periphery of the sheet to a point near the hole 17. Thus the sheet 16 is divided into four sections 19 and 20. In forming the flower, each section 19 is folded upward about the line indicated by the broken line 21 at the base of the section, and likewise each section 20 is similarly folded upward about the line indicated at 22. When thus folded upward to form a cup, that is, the flower, then the sections 19 and 20 form the petals of the flower, as shown in Figure 3. As flowers usually have a calyx of green leaves on the bottom, as a separate cross-like member 23 is secured to the underside of the flower 13, and the base 24 of the flower, with the member 23, is then clamped between the nuts 14 and 15.

As a person using such flowers may wish to change the species from time to time, for instance at one season to have tulips, and at another to have another flower, such as a rose, a modified form of stem has been provided so that the flowers of one form may be readily interchangeable with those of another kind. In the modified form of stem 25, a groove 26 is provided in one side thereof in the threaded top 12. A resilient strip 27 is anchored by a screw or the like 28 in the lower end of the groove 26 and extends upward to cover the length of the groove. The tension of the strip 27 normally retains it in position substantially flush with the periphery of the base of the threads 12. The upper portion of the strip 27 is provided with a plurality of rounded teeth 29 which projects beyond the outer periphery of the threads 12. For use on the stem 25, the hole through the base 24 of the flower is threaded so that the flower can be screwed on to the stem. In thus mounting the flower on the stem, as it progresses downward on the threads 12, the periphery of the hole through the base 24 will ride over the rounded teeth 28 and depress the upper end of the strip 27 into the groove 26. The flower may be brought to rest between any pair of adjacent teeth 29, in which position of the base the strip 27 will reassume its normal position with the base 24 will be locked between the said teeth and securely held on the stem. To remove the flower 13 from the stem, the strip 29 is depressed into its groove to release the base 24 from the teeth 29 and the flower is then simply unscrewed. In this way the stem 25 may be used to accommodate any one of a variety of flowers without requiring the use of any tools to mount or dismount the flower. All the parts of the flower and stem are, of course, suitably painted or colored.

Obviously, modifications in form and structure may be made without departing from the spirit and scope of the invention.

I claim:

1. An article of manufacture comprising a metal stem having its upper end threaded, an imitation flower formed of a single sheet of flat metal having a hole through the center and slitted and folded to simulate a flower, said hole being threaded and adapted to engage said threaded end of said stem, and resilient means on said stem for releasably locking said imitation flower on said stem.

2. An article of manufacture comprising a metal stem having its upper end threaded, an imitation flower formed of a single sheet of flat metal having a hole through the center and slitted and folded to simulate a flower, said hole being threaded and adapted to engage said threaded end of said stem, and resilient means on said stem for releasably locking said imitation flower on said stem, said means comprising a spring finger having teeth on one side, said stem having a longitudinal groove in its upper end, said finger being secured at its lower end in said groove with said teeth on the outside and in alignment with the teeth of said stem, the upper portion of said spring being adapted to be depressed into said groove, said spring finger teeth normally extending radially beyond the periphery of said stem teeth.

WILLIAM F. MARTIN.